(12) United States Patent
Denk et al.

(10) Patent No.: US 7,629,600 B2  
(45) Date of Patent: Dec. 8, 2009

(54) ARRANGEMENT COMPRISING TWO ELEMENTS WHICH CAN BE ROTATABLY DISPLACED IN RESPECT OF ONE ANOTHER

(75) Inventors: Joachim Denk, Nürnberg (DE); Hubert Schierling, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/316,018

(22) Filed: Dec. 9, 2008

(65) Prior Publication Data

US 2009/0152478 A1 Jun. 18, 2009

(30) Foreign Application Priority Data

Dec. 17, 2007 (EP) .................................. 07024424

(51) Int. Cl.
*G02B 6/26* (2006.01)
*G02B 27/00* (2006.01)

(52) U.S. Cl. .................... 250/551; 250/227.11; 385/25; 398/141

(58) Field of Classification Search ................. 250/551, 250/227.11, 234, 239; 385/25, 26; 398/140–142
See application file for complete search history.

(56) References Cited

U.S. PATENT DOCUMENTS

| 4,525,025 A | 6/1985 | Hohmann et al. |
| 7,149,382 B2 * | 12/2006 | Schilling et al. ............... 385/25 |
| 2004/0062344 A1 | 4/2004 | Popescu et al. |
| 2005/0013535 A1 * | 1/2005 | Popescu ...................... 385/26 |
| 2006/0127098 A1 | 6/2006 | Schilling et al. |

FOREIGN PATENT DOCUMENTS

DE 10 2006 054 052 5/2008

* cited by examiner

*Primary Examiner*—Kevin Pyo

(57) ABSTRACT

Data is to be exchanged between a rotating element and a further element, with the rotating element being rotated by way of a hollow shaft. Light is coupled into torus halves and is reflected into a torus half and onto torus inner walls so often by way of a small opening until it exits at an opening of the other torus half. In a first embodiment, a torus-shaped optical fiber is divided into two torus halves. In another embodiment, hollow tori are used, which are filled with a fluid, namely either with a liquid or with air.

14 Claims, 5 Drawing Sheets

ARRANGEMENT COMPRISING TWO ELEMENTS WHICH CAN BE ROTATABLY DISPLACED IN RESPECT OF ONE ANOTHER

CROSS REFERENCE TO RELATED APPLICATIONS

This application claims priority of European Patent Office application No. 07024424.9 EP filed Dec. 17, 2007, which is incorporated by reference herein in its entirety.

FIELD OF INVENTION

The invention relates to an arrangement comprising two elements, of which the one element can be rotated about an axis of rotation relative to the other element, with a device enabling the communication from the one to the other element being arranged on both elements. Such an arrangement is needed in the case of modern machine concepts, e.g. with rotary indexing machines and production machines. Data communication is usually effected in a wired fashion. If continuous rotation is to be enabled, a wireless transmission by way of a rotatable interface is necessary. It is known to allow the data communication to take place by way of light signals. This can be easily achieved by a light emitter being arranged on the one element and a light receiver being arranged on the other element precisely in the axis of rotation. This simple arrangement can however frequently not be realized because hollow shafts have to be used in order to be able to bring additional media, e.g. cooling liquid, closer to additional rotating transformers. One problem now consists in it no longer being possible to use a punctiform transmitter and a punctiform receiver and nevertheless having to be able to transmit the communication signals with any rotational positions. Most efforts consist in emitting the light signals on the transmitter side by way of a complete ring and providing a punctiform receiver, which then receives light from the ring with each rotational position of the rotatable element. It is very difficult to impress light signals onto such a ring. One example of such an arrangement, in which a light ring is generated about a hollow shaft for data communication purposes, is described in DE 10 2006 054 052.2.

SUMMARY OF INVENTION

It is an object of the invention to provide an arrangement of the type mentioned in the introduction which is easy to construct, in which the device for data communication is embodied so as to be as inconspicuous as possible.

The object is achieved by an arrangement according to the claims. In accordance with the invention, provision is thus made to provide a cover body on both elements in each instance for the data communication device. The precise appearance of the cover body is irrelevant. It is essential for the space surrounded by the cover body to have a defined form. This space can be defined by the inner surface of the cover body: it must be annular, namely arranged in a concentric fashion relative to the axis of rotation, and it should have a semicircular cross-section. The communication between the two devices is now carried out such that: the cover body of both elements has an opening. A light source is provided on an element and this couples light into the space defined by the inner surface of the cover body. A light receiver is assigned to the opening on the other cover body, so that light can be coupled out of the space defined by the inner surface of the cover body to the light receiver by way of the said opening. The design of the arrangement must ensure that light coupled in by the light source actually reaches the light receiver at some point. This takes place by way of multiple reflections of the light on the inner surfaces of the cover body. The light is reflected until it reaches the point of the one cover body at some point, at which the opening leads to the light receiver. It is then ensured, independently of the angle or rotation of the one element relative to the other element, that the light reaches the light receiver from the light source at some point. The invention is advantageous in that a single light source, e.g. a transmitting diode, can be used, and that a single light receiver, a single receiver diode, can be used. The manufacture of the arrangement is as a result already cost-effective and energy is saved during operation, unlike in embodiments of the prior art for instance, in which a plurality of light sources are used.

The semicircular cross-sections of the inner surfaces of the two cover bodies ideally extend to form a circle, namely preferably such that each cover body provides a semicircular cross-section. This means nothing other than that the space defined by the inner surface is precisely half of a torus, and the space of the other element which is defined by the inner surface is the second half of the torus in each instance. Such an arrangement is particularly easy to manufacture, by an annular optical fiber with a circular cross-section being easily divided into two parts, which are arranged opposite to one another on different elements. In this case, the cover bodies, like the optical fibers, usually surround an annular optical fiber core in each instance, namely the material from which the optical fiber core is formed has a greater refractive index than the material from which the cover body is formed. Light is then knowingly reflected onto the inner surface of the cover body.

The advantage of the simple producibility is gained by the disadvantage that the tolerances are extremely small, thereby concerning the gap between the two torus halves. Furthermore, the light beam, after it has been reflected into the one torus half, has to enter the air between the two elements in the said gap after passing through the optical fiber core initially from the optical fiber core, and then from the air into the optical fiber core of the other torus half. Scattering losses occur in the case of all these transitions. These disadvantages are avoided with other embodiments of the invention, namely it is common hereto that a fluid is arranged in the cover body. The inner surface of the cover body thus forms the boundary of the part of the device which consists of a solid body, so that a hollow torus is formed.

With a particularly simple embodiment, air is used very simply as fluid. The inner surface of the cover body can be very easily metalized.

Another embodiment implies that a liquid is used, which then fills the two hollow tori and naturally also the space between the two elements, of which the one can be rotated relative to the other. This is realized best in that the liquid is located in a chamber between two sealed pivot bearings, which couple the two elements to one another. The liquid is to be transparent. The inner surface of the cover body can naturally also be metalized here, but it is also possible in a simple fashion to form the cover body from a material, which has a lower refractive index than the liquid. E.g. the cover body can consist of glass and glycerin can be used as the liquid. This embodiment is similar to the embodiment with the optical fiber halves, because an optical fiber-conducting liquid is used instead of the optical fiber conductive core.

The embodiments, in which the fluid is used, are advantageous in that no transitions exist between different media, so that no losses occur in the light beam power until the light beam reaches the light receiver. It is then possible to potentially operate using a weaker light source and/or a less sensitive light receiver than in the case of the embodiment with the optical fiber halves.

As already mentioned, the inventive idea is particularly suited to the rotation of one of the elements taking place by way of a hollow shaft. The cover bodies then naturally surround the hollow shaft.

BRIEF DESCRIPTION OF THE DRAWINGS

Preferred embodiments of the invention are described below with reference to the drawing, in which.

DETAILED DESCRIPTION OF INVENTION

Figure 3:
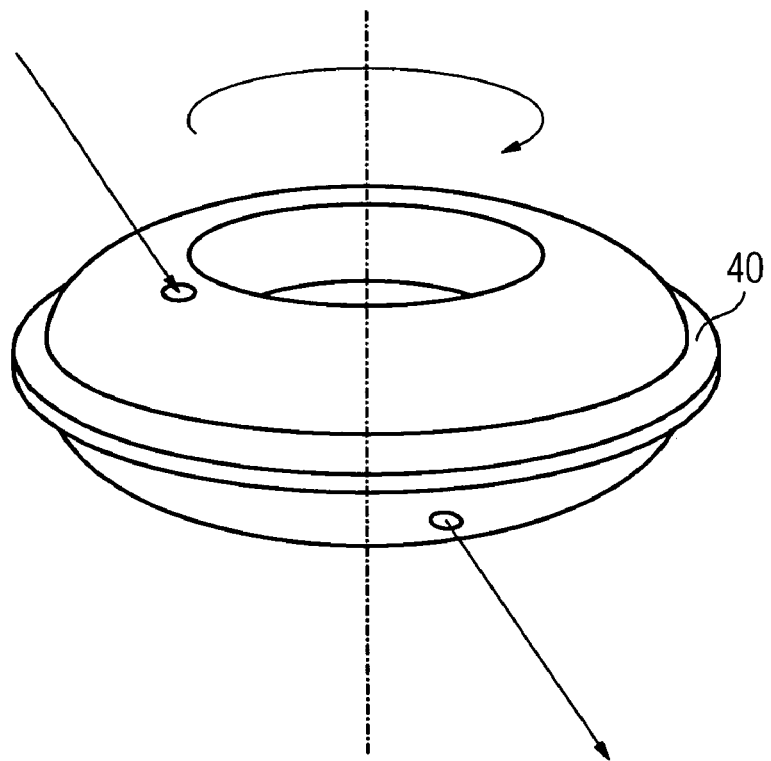
FIG. 3 shows the principle of a second embodiment of the invention.
Figure 7:
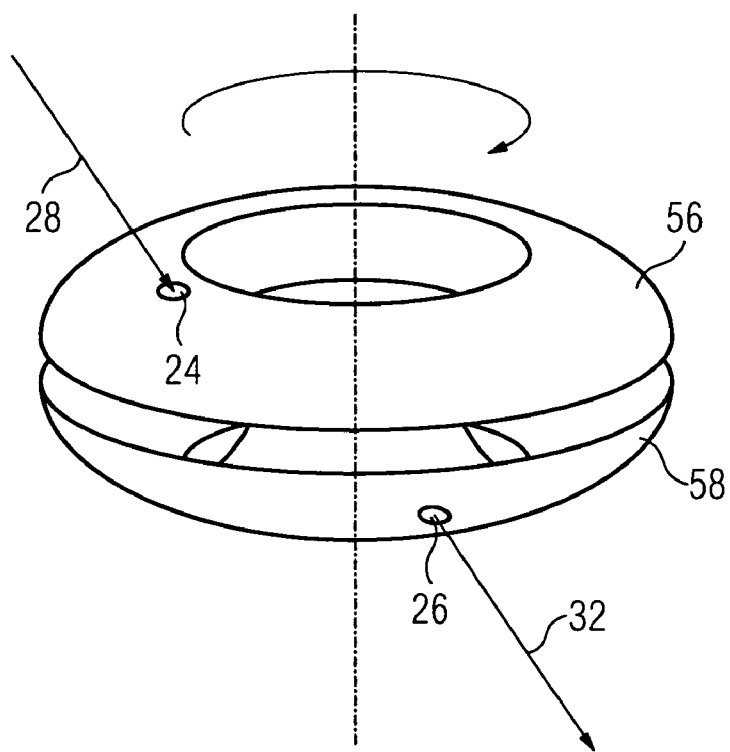
FIG. 7 shows the principle of a third embodiment of the invention and FIG. 8 shows a cross-section through the arrangement from FIG. 7.

This currently concerns a machine, on which an element can be rotated, typically opposite to an element which is fixed in the space. It is now frequently necessary in the case of modern applications that information is transmitted from the fixed element to the rotating element or vice versa. With the present invention, it is common to different embodiments that they are suited to the rotation taking place by way of a hollow shaft, so that no exchange of data is possible in the axis of rotation. It is common to all embodiments that the data communication takes place by way of optical signals. The present embodiments allow only one single light source and one single light receiver to have to be used. Three different embodiments are shown in FIGS. 1, 3 and 7, namely neither the individual elements are shown, nor light sources and light receivers, but instead only the medium, by way of which the light is transmitted from the light source to the light receiver.

Figure 1:
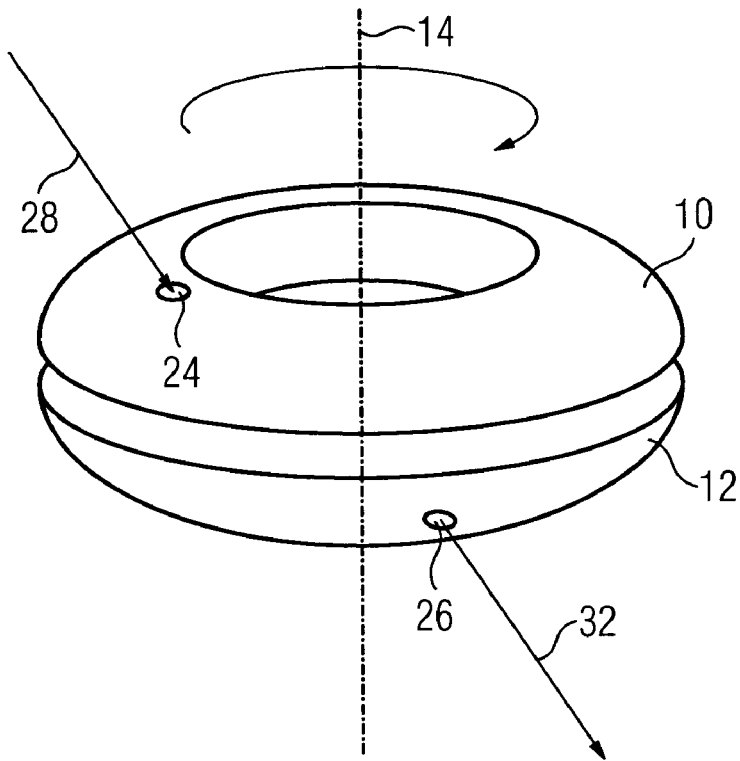
FIG. 1 shows the principle of a first embodiment of the invention.
Figure 2:
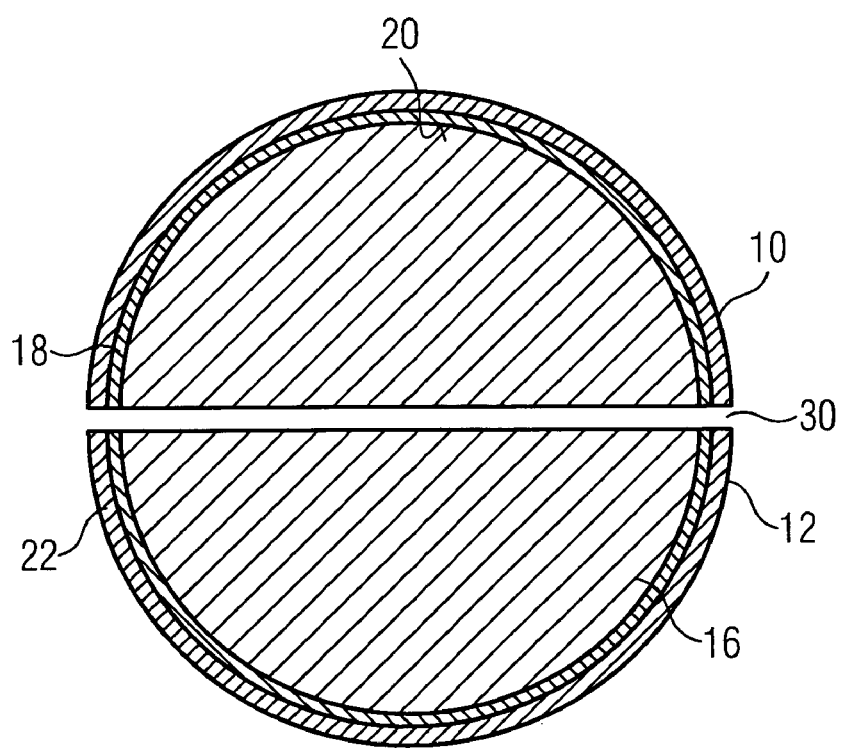
FIG. 2 shows a cross-section through the arrangement shown in FIG. 1.

With the embodiment in FIG. 1, two halves of a torus-shaped optical fiber are used herefor. In other words, each half 10 and 12 is annular, namely arranged on the respective elements such that the center point of the ring coincides with the axis of rotation 14 of the rotatable element. The cross-section of the torus halves 10 and 12 is semicircular. In a manner known per se, each optical fiber half 10 and/or 12 includes an optical fiber core 16, which is surrounded by a cover body 18. The material, from which the core 16 is formed, has a higher refractive index than the material from which the cover body 18 is formed. It is essential to the functionality of the invention that the inner surface 20 of the cover body 18 is exactly semicircular. As is generally known from optical fibers, the light emitted by the optical fiber is reflected onto this inner surface due to the minimal refractive index of the cover body material. In the case shown in FIG. 2, a coating 22 applied to the cover body 18 is also half torus-shaped in each instance. The form of the outer contour is however not relevant to the functionality of the invention. An opening 24 is now embodied in the one optical fiber half 10 and an opening 26 is likewise embodied in the second optical fiber half 12. A light source (e.g. a transmitting diode) not shown in FIG. 1 emits light, as symbolized by the arrow 28, and couples this into the core 16 by way of the opening 24. The light passes through the core 16 of the optical fiber half 10, enters the air gap 30 between the two optical fiber halves 10 and 12 and then the core of the optical fiber half 12, in order to finally reach the inner surface 20 of the cover body of this optical fiber guide half 12 and to be reflected there. The reflected light reaches the inner surface 20 of the first optical fiber half, is reflected there and the to and fro reflection of the light takes place until the light beam reaches the opening 26 in the optical fiber half 12 and exits there, as shown by the arrow 32, and can reach a light receiver (e.g. a receiving diode) (not shown in FIG. 1). The characterizing feature of the inventive idea is that the light of the one light source eventually reaches the one light receiver independently of the angle of rotation of the two elements and thus of the two optical fiber halves 10 and 12.

Figure 4:
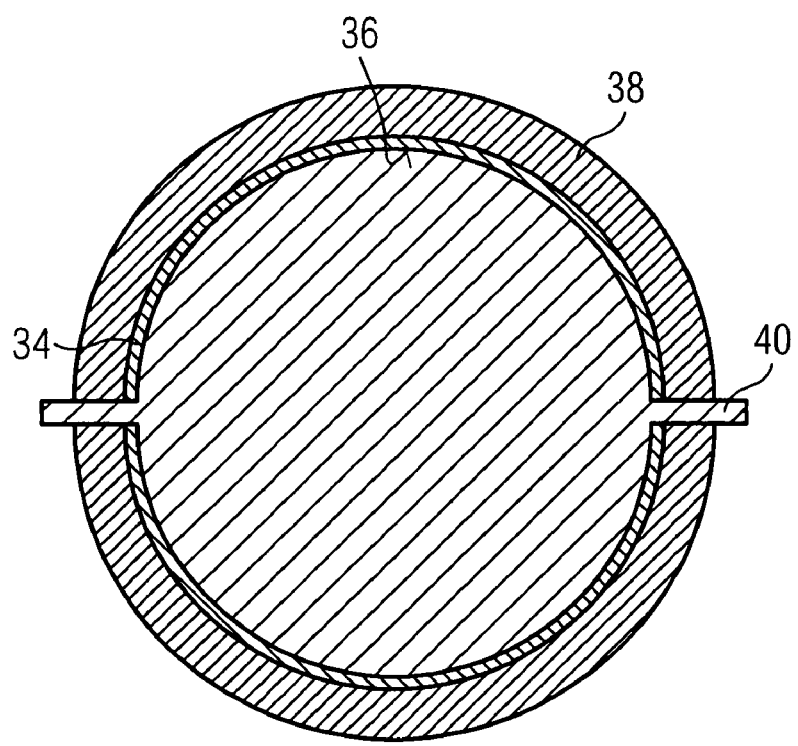
FIG. 4 shows a cross-section through the arrangement from FIG. 3.

The same basic principle can also be used in another manner as by the use of optical fiber conductor halves. A second embodiment of the invention is shown with reference to FIG. 3 and FIG. 4. In this case, two hollow torus halves are used. The cover body 34 forms a half torus-shaped inner surface 36, which, unlike in the embodiment according to FIGS. 1 and 2 does not pass into a solid body like the optical fiber conductor 16, but instead forms a space, which can be filled with a liquid. The outer contour of the cover body 34 plays no role. With the embodiment in FIG. 4, a semi hollow torus-shaped supporting body 38 is shown. The invention functions precisely like the first embodiment if the cover body 34 is formed from a material with a lower refractive index than with the liquid designated with 40 and shown in FIG. 3, to simplify matters, as a disk. For instance, glass with a refractive index of 1.46 can be used for instance as cover body material and glycerin with a refractive index of 1.474 can be used as liquid.

Figure 5:
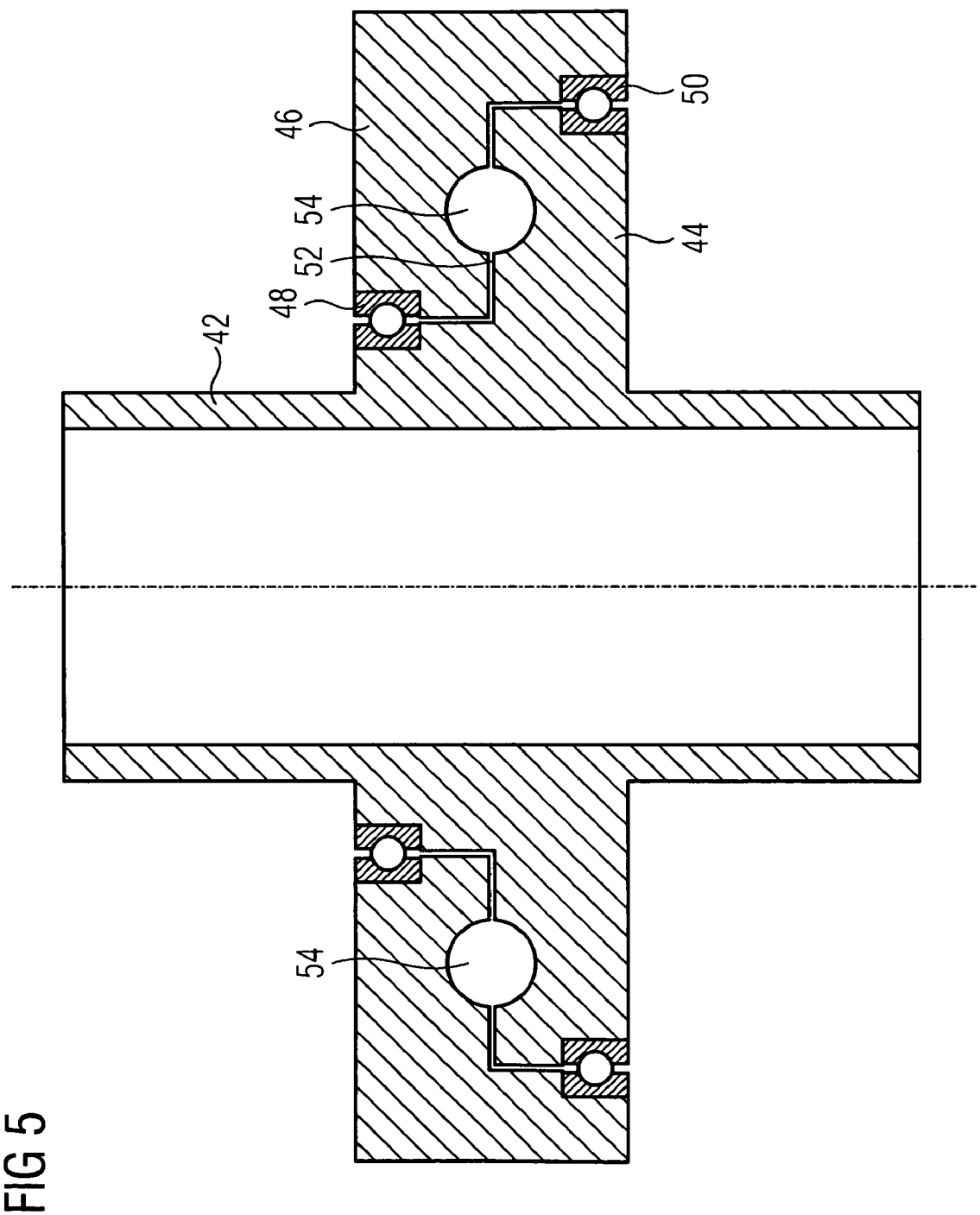
FIGS. 5 and 6 show concrete designs in respect of a second embodiment of the invention.
Figure 6:
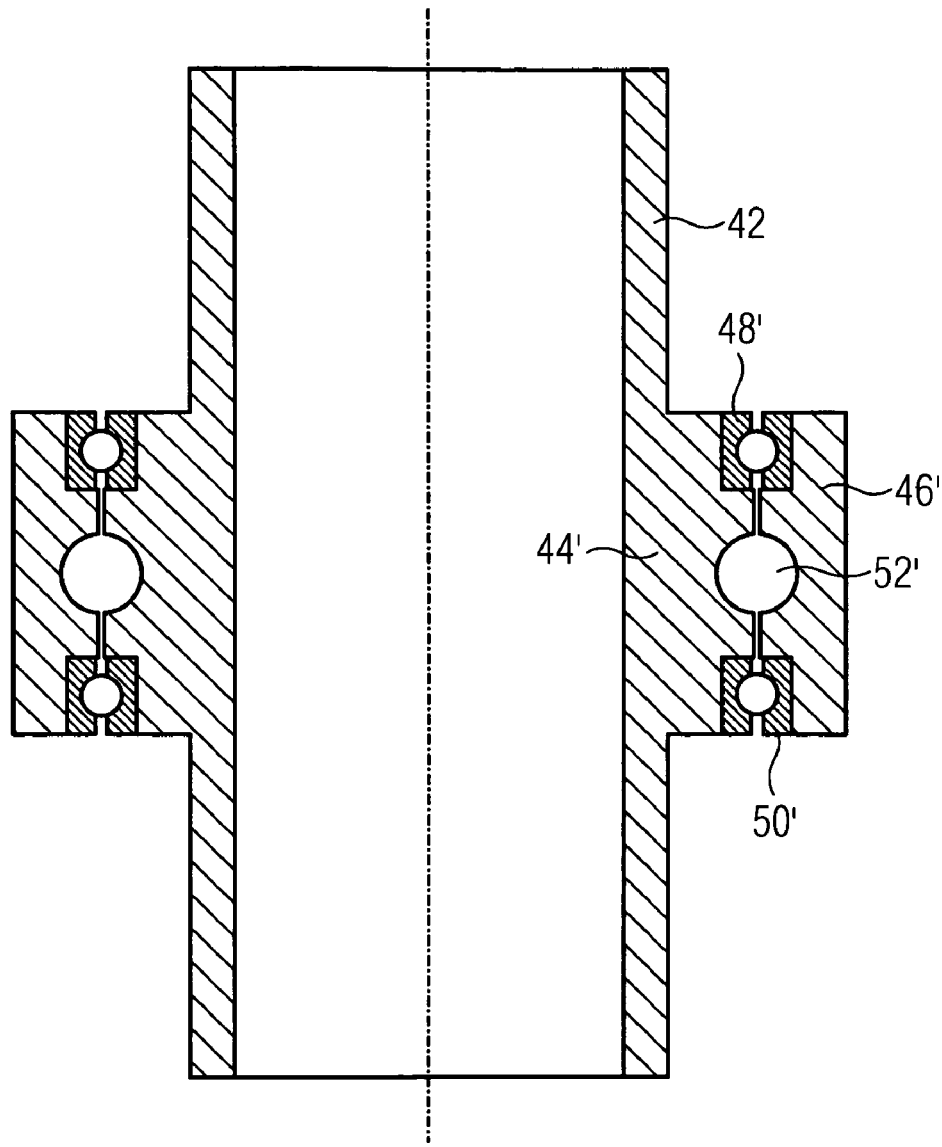

Particular requirements in terms of design result due to a liquid being arranged between the parts which can be rotated in respect of one another. FIGS. 5 and 6 show exemplary embodiments. As mentioned in the introduction, the invention is preferably used if a hollow shaft 42 is provided, by way of which the rotation of the rotatable element takes place. The hollow shaft 42 is currently integrated into the rotatable element 44. The fixed element is designated with 46 in FIG. 5. The rotation is enabled by brackets 48 and 50, which seal a chamber 52. The frog of the chamber 52 is a torus 54. FIG. 5 shows a cross-section through the arrangement, in which the torus 54 is cut in two, at positions which are offset by 180°. FIG. 5 shows the cover body (not in detail). One has to imagine this as a coating in a recess in the element 46 and/or in the element 44. With the embodiment according to FIG. 5, the communication takes place in the axial direction.

A communication in the radial direction is also enabled. One embodiment, in which this is the case, is shown in FIG. 6. There the rotatable element is shown with 44' and the fixed element is shown with 46'. A liquid chamber 52' is arranged between pivot bearings 48' and 50' such that the two halves of the hollow torus are separated from one another by an axial line, so that the light beam always has a radial part, if it is sent from the one hollow torus half to the other.

Figure 8:
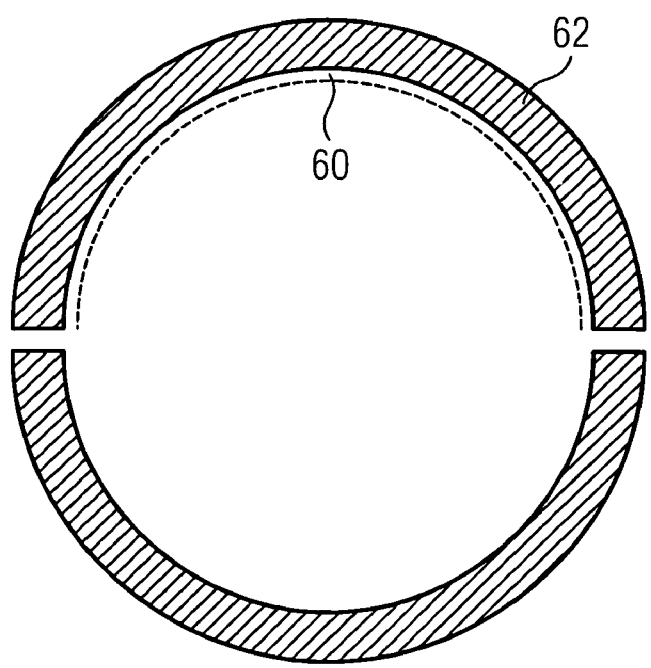

A further embodiment of the invention is shown in FIG. 7: As with the embodiment according to FIG. 3, two hollow torus halves 56 and 58 are used in this way. It is important that the cover body 60 forms an inner space, which has the form of a half torus. The precise outer contour of the cover body 60 or of the body, in which the cover body 60 is found if necessary (see reference character 62 in FIG. 8), is by contrast insignificant. With the embodiment according to FIG. 7 and FIG. 8, the inner surface of the cover body 60 has to be metalized.

Air is currently easily used as fluid, which fills the two hollow torus halves, as a result of which a chamber in the manner of the chamber 52 and/or 52' is unnecessary. Light entering the hollow torus by way of the opening 24 according to the arrow 28 is reflected to and fro onto the inner surfaces of the cover body 60 of the two hollow torus halves 56 and 58 until the light beam reaches the opening 26 and exits according to the arrow 32.

The invention claimed is:

1. An arrangement, comprising:
    two elements, of which the one element is rotated relative to the other element about an axis of rotation;
    a device enabling data transmission from one to the other element, the device being arranged on both of the two elements, wherein the device includes a cover body which has an inner surface, which is annular and arranged so as to be concentric to the axis of rotation and has a semicircular cross-section, the cover body having at least one opening on both elements, so that a light source located on one element outside the cover body couples light into the space defined by the inner surface of the cover body and light is coupled out of the space defined by the inner surface of the cover body at the other element to a light receiver arranged outside the cover body, and wherein the light coupled in by the light source is reflected onto the inner surfaces of the cover body until it is coupled out at the light receiver.

2. The arrangement as claimed in claim 1, wherein the semicircular cross-sections of the inner surfaces extend to form a circle.

3. The arrangement as claimed in claim 1, wherein the cover body of the device surrounds an annular optical fiber core, the material of the optical fiber core having a greater refractive index than the material of the cover body.

4. The arrangement as claimed in claim 2, wherein the cover body of the device surrounds an annular optical fiber core, the material of the optical fiber core having a greater refractive index than the material of the cover body.

5. The arrangement as claimed in claim 1, wherein a fluid is arranged in the cover body of the device.

6. The arrangement as claimed in claim 2, wherein a fluid is arranged in the cover body of the device.

7. The arrangement as claimed in claim 5, wherein the fluid is air and the inner surface of the cover body is metalized.

8. The arrangement as claimed in claim 6, wherein the fluid is air and the inner surface of the cover body is metalized.

9. The arrangement as claimed in claim 5, wherein the fluid is a liquid arranged in a chamber between two sealed pivot bearings which couple the two elements to one another, the liquid being transparent and having a greater refractive index than the material of the cover body.

10. The arrangement as claimed in claim 6, wherein the fluid is a liquid arranged in a chamber between two sealed pivot bearings which couple the two elements to one another, the liquid being transparent and having a greater refractive index than the material of the cover body.

11. The arrangement as claimed in claim 9, wherein the cover body is made of glass and the liquid is glycerin.

12. The arrangement as claimed in claim 10, wherein the cover body is made of glass and the liquid is glycerin.

13. The arrangement as claimed in claim 1, wherein both cover bodies of the two elements surround a hollow shaft, by way of which a rotation of the two elements is effected.

14. The arrangement as claimed in claim 2, wherein both cover bodies of the two elements surround a hollow shaft, by way of which a rotation of the two elements is effected.

* * * * *